US012769869B2

(12) United States Patent
Upadhyay et al.

(10) Patent No.: US 12,769,869 B2
(45) Date of Patent: Oct. 20, 2026

(54) SYSTEMS AND METHODS FOR PRIVACY PRESERVING, NETWORK ANALYTICS, AND ANOMALY DETECTION ON DECENTRALIZED, PRIVATE, PERMISSIONED DISTRIBUTED LEDGER NETWORKS

(71) Applicant: JPMORGAN CHASE BANK, N.A., New York, NY (US)

(72) Inventors: Sudhir Upadhyay, Edison, NJ (US); Monik Raj Behera, Bengaluru (IN); Suresh Shetty, Bengaluru (IN); Tulasi Movva, Trumbull, CT (US); Palka Patel, West Hartford, CT (US); Vinay Somashekar, Jersey City, NJ (US); Thomas Eapen, Jersey City, NJ (US); Chang Yang Jiao, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 226 days.

(21) Appl. No.: 17/806,024

(22) Filed: Jun. 8, 2022

(65) Prior Publication Data

US 2023/0325528 A1 Oct. 12, 2023

(30) Foreign Application Priority Data

Apr. 12, 2022 (IN) ............................. 202211021939

(51) Int. Cl.

*G06F 21/62* (2013.01)
*G06N 3/045* (2023.01)
*G06N 3/088* (2023.01)

(52) U.S. Cl.

CPC ......... *G06F 21/6245* (2013.01); *G06N 3/045* (2023.01); *G06N 3/088* (2013.01)

(58) Field of Classification Search

CPC .. G06F 21/60; G06F 21/6245; G06F 21/6227; G06N 20/00; G06N 3/02; H04L 63/08
See application file for complete search history.

(56) References Cited

U.S. PATENT DOCUMENTS

2019/0332955 A1* 10/2019 Manamohan ......... G06F 18/214
2020/0134628 A1* 4/2020 Jia .......................... G06N 20/00

(Continued)

FOREIGN PATENT DOCUMENTS

CN 114254386 3/2022
EP 3786872 3/2021

OTHER PUBLICATIONS

Munir Mohsin et al. (DeepAnT: A Deep Learning Approach for Unsupervised Anomaly Detection in Time Series, IEEE Access, vol. 7,) (Year: 2018).*

(Continued)

*Primary Examiner* — Beemnet W Dada
*Assistant Examiner* — Sayeda Salma Nahar
(74) *Attorney, Agent, or Firm* — GREENBERG TRAURIG LLP

(57) ABSTRACT

A method for privacy preserving machine learning model sharing may include a computer program for a first institution of a plurality of institutions in a distributed ledger network: receiving transaction data for a transaction; training a local machine learning model using the transaction data; submitting parameters for the local machine learning model to the distributed ledger network as a private transaction with a trusted entity, wherein the trusted entity receives parameters for a plurality of local machine learning models from the distributed ledger network for the plurality of institutions in the distributed ledger network and aggregates the parameters into an aggregated machine learning model and submits the aggregated parameters to the distributed ledger network as one or more transactions; receiving, (Continued)

from the distributed ledger network, the aggregated parameters for the aggregated machine learning model; and updating the local machine learning model with the aggregated parameters.

20 Claims, 3 Drawing Sheets

(56) References Cited

U.S. PATENT DOCUMENTS

| | | | | |
|---|---|---|---|---|
| 2020/0244435 | A1* | 7/2020 | Shpurov | G06N 3/045 |
| 2020/0272934 | A1* | 8/2020 | Manamohan | G06F 11/1438 |
| 2020/0285980 | A1* | 9/2020 | Sharad | G06N 3/098 |
| 2021/0409220 | A1* | 12/2021 | Seraj | G06N 5/04 |
| 2022/0044162 | A1* | 2/2022 | Zhang | G06F 21/64 |

OTHER PUBLICATIONS

Siddharth Bhatia et al. (MIDAS: Micro Cluster-Based Detector of Anomalies in Edge Streams, The Thirty-Fourth AAAI Conference on Artificial Intelligence (AAAI-20)) (Year: 2020).*

Munir Mohsin et al. ("DeepAnT: A Deep Learning Approach for Unsupervised Anomaly Detection in Time Series", IEEE Access, vol. 7, Dec. 19, 2018 (Dec. 19, 2018)) (Year: 2018).*

Siddharth Bhatia et al. (MIDAS: Micro Cluster-Based Detector of Anomalies in Edge Streams, The Thirty-Fourth AAAI Conference on Artificial Intelligence (AAAI-20)) (Year: 2020) (Year: 2020).*

Munir Mohsin et al. ("DeepAnT: A Deep Learning Approach for Unsupervised Anomaly Detection in Time Series", IEEE Access, vol. 7, Dec. 19, 2018 (Dec. 19, 2018)) (Year: 2018) (Year: 2018).*

Siddharth Bhatia et al. (MIDAS: Micro Cluster-Based Detector of Anomalies in Edge Streams, The Thirty-Fourth AAAI Conference on Artificial Intelligence (AAAI-20)) (Year: 2020) (Year: 2020) (Year: 2020).*

Munir Mohsin et al. ("DeepAnT: A Deep Learning Approach for Unsupervised Anomaly Detection in Time Series", IEEE Access, vol. 7, Dec. 19, 2018 (Dec. 19, 2018)) (Year: 2018) (Year: 2018) (Year: 2018).*

International Search Report and Written Opinion of the International Searching Authority, dated Jun. 7, 2023, from corresponding International Application No. PCT/US2023/065639.

Yang, Wensi; et al., FFD: A Federated Learning Based Method for Credit Card Fraud Detection: 8th International Congress, Held as Part of the Services Conference Federation, SCF 2019, San Diego, CA, USA, Jun. 25-30, 2019, Proceedings.

Yin, Lihua; et al., "A Blockchain-based Collabroative Training Method for Multi-party Data Sharing", Computer Communicatoins, Elsevier Science Publishers BV, Amsterdam, NL, vol. 173, Mar. 31, 2021.

Munir, Mohsin, et al., "DeepAnt: A Deep Learnings Approach for Unsupervised Anomaly Detection in the Time Series". vol. 7, Dec. 19, 2018, pp. 1991-2005.

Raj, Behera Monik; et al., "Federated Learning using Distributed Messaging with Entitlements for Anonymous Computation and Secure Delivery of Model", Dec. 1, 2020.

* cited by examiner

SYSTEMS AND METHODS FOR PRIVACY PRESERVING, NETWORK ANALYTICS, AND ANOMALY DETECTION ON DECENTRALIZED, PRIVATE, PERMISSIONED DISTRIBUTED LEDGER NETWORKS

RELATED APPLICATIONS

This application claims priority to, and the benefit of, Indian Provisional Patent Application No. 202211021939, filed Apr. 12, 2022, the disclosure of which is hereby incorporated, by reference, in its entirety.

BACKGROUND OF THE INVENTION

1. Field of the Invention

Embodiments generally relate to systems and methods for privacy preserving, network analytics, and anomaly detection on decentralized, private, permissioned distributed ledger networks.

2. Description of the Related Art

Banks, Financial institutions (FIs), and other organizations maintain transaction data that includes personal identifiable information (PII), such as names, account numbers, social security numbers, etc. For example, this data may be received over a transaction network.

On decentralized, private permissioned distributed ledger networks, all transactions are private even from the network operator. This poses a significant risk to managing of network since the network operator has no visibility into the meta data and activities on the network. A bad actor/participant can leverage the network for malicious activity and affect the smooth functioning of the network.

SUMMARY OF THE INVENTION

Systems and methods for privacy preserving, network analytics, and anomaly detection on decentralized, private, permissioned distributed ledger networks are disclosed. In one embodiment, a method for privacy preserving machine learning model sharing may include: (1) receiving, by a computer program for a first institution of a plurality of institutions in a distributed ledger network, transaction data for a transaction; (2) training, by the computer program for the first institution, a local machine learning model using the transaction data; (3) submitting, by the computer program for the first institution, parameters for the local machine learning model to the distributed ledger network as a private transaction with a trusted entity, wherein the trusted entity receives parameters for a plurality of local machine learning models from the distributed ledger network for the plurality of institutions in the distributed ledger network and aggregates the parameters into an aggregated machine learning model and submits the aggregated parameters to the distributed ledger network as one or more transactions; (4) receiving, by the computer program for the first institution and from the distributed ledger network, the aggregated parameters for the aggregated machine learning model; and (5) updating, by the computer program for the first institution, the local machine learning model with the aggregated parameters.

In one embodiment, the local machine learning model may be trained to detect transaction anomalies.

In one embodiment, the local machine learning model and/or the aggregated machine learning model may include a DeepAnT model.

In one embodiment, the trusted entity may aggregate the parameters into the aggregated machine learning model using a secure aggregation protocol.

In one embodiment, the aggregated parameters for the aggregated machine learning model may be received in a private transaction.

In one embodiment, the aggregated parameters for the aggregated machine learning model may include updates to the local machine learning model.

In one embodiment, the method may also include receiving, by the computer program for the first institution, transaction data for a transaction between the first institution and a second institution; generating, by the computer program for the first institution and using the local machine learning model, an anomaly score for the transaction based on the transaction data; and providing, by the computer program for the first institution, metadata for the transaction to the trusted entity, wherein the trusted entity generates anomaly scores for the first institution, the second institution, and the pair of the first institution and the second institution using the metadata.

In one embodiment, the method may also include executing, by the computer program for the first institution, an action in response to the anomaly score exceeding a threshold, wherein the response comprises stopping the transaction.

In one embodiment, the method may also include receiving, by the computer program for the first institution and from the trusted entity an alert, wherein the trusted entity generates the alert in response to a real-time anomaly score generated by a real-time anomaly detection engine exceeding a threshold.

In one embodiment, the method may also include executing, by the computer program for the first institution, an action in response to the real-time anomaly score exceeding a threshold, wherein the response comprises stopping the transaction.

According to another embodiment, a method for privacy preserving machine learning model sharing may include: (1) receiving, by a computer program for a trusted entity in a distributed ledger network, a plurality of private transactions from a plurality of institutions in the distributed ledger network, each of the private transactions comprising parameters for a local machine learning model for one of the institutions; and (2) aggregating, by the computer program for the trusted entity, the parameters into an aggregated machine learning model; submitting, by the computer program for the trusted entity, aggregated parameters for the aggregated machine learning model to the distributed ledger network; wherein each of the plurality of institutions updates its local machine learning model with the aggregated parameters.

In one embodiment, the local machine learning models may be trained to detect transaction anomalies.

In one embodiment, the local machine learning models and/or the aggregated machine learning model may include a DeepAnT model.

In one embodiment, the trusted entity may aggregate the parameters into the aggregated machine learning model using a secure aggregation protocol.

In one embodiment, the aggregated parameters for the aggregated machine learning model may be submitted to the distributed ledger network as a plurality of private transactions.

In one embodiment, the aggregated parameters for a first institution of the plurality of institutions may be different from the aggregated parameters for a second institution of the plurality of institutions.

In one embodiment, the aggregated parameters for the aggregated machine learning model may include updates to the local machine learning models.

In one embodiment, the method may also include receiving, by the computer program for the trusted entity, anomaly scores from a first institution and a second institution, the first institution and the second institution involved in a transaction; receiving, by the computer program for the trusted entity, metadata for the transaction between the first institution and the second institution involved in a transaction; generating, by the computer program for the trusted entity, anomaly scores for the first institution, the second institution, and the pair of the first institution and the second institution using the metadata; and generating, by the computer program for the trusted entity, a real-time anomaly score using a real-time anomaly detection engine and the anomaly scores for the first institution, the second institution, and the pair of the first institution and the second institution.

In one embodiment, the method may also include generating, by the computer program for the trusted entity, an alert in response to a real-time anomaly score generated by a real-time anomaly detection engine exceeding a threshold. The real-time anomaly detection engine may execute a Microcluster-Based Detector of Anomalies in Edge Streams-F algorithm.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are generally directed to systems and methods for privacy preserving, network analytics, and anomaly detection on decentralized, private, permissioned distributed ledger networks.

Embodiments may leverage deep learning and federated learning on private, permissioned distributed ledger networks. Local models may be trained at individual nodes of a distributed ledger network using the node's local data, and may then be communicated to a trusted node via, for example, private transactions. No underlying data is sent from local nodes to the trusted node. The trusted node may aggregate the data, such as models, from the local nodes into an aggregated model using a secure aggregation protocol. Parameters for the aggregated model may then be provided to the local nodes, and the local nodes may use the aggregated model to update their local models, for example, future predictions, anomaly detection, etc.

Figure 1:
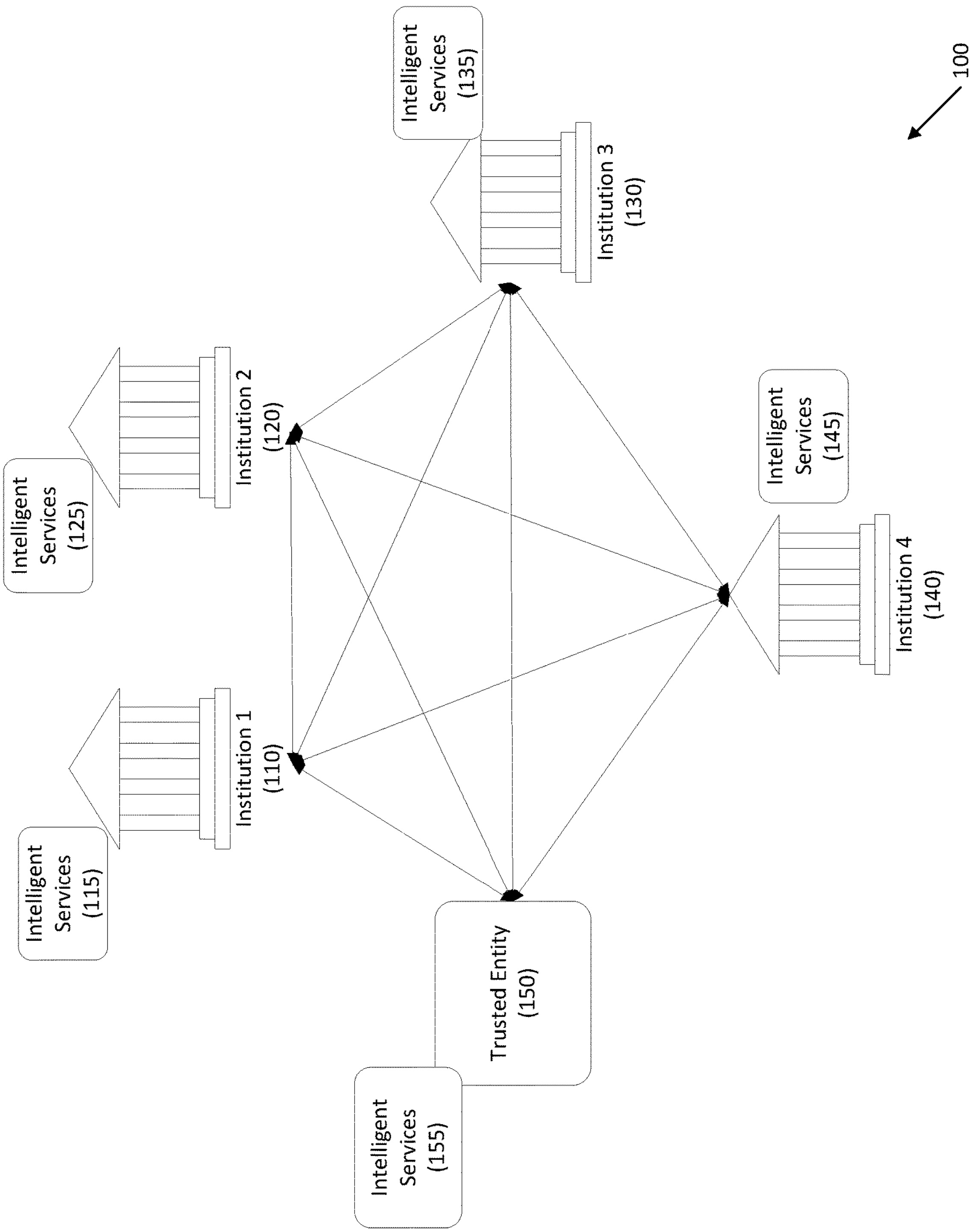
FIG. 1 depicts a system for privacy preserving, network analytics, and anomaly detection on decentralized, private, permissioned distributed ledger networks according to an embodiment.

Referring to FIG. 1, a system for privacy preserving, network analytics, and anomaly detection on decentralized, private, permissioned distributed ledger networks is provided according to an embodiment. System 100 may include a plurality of institutions 110, 120, 130, and 140 that may participate as distributed ledger nodes in a distributed ledger network. Institutions 110, 120, 130, and 140 may be any sort of institution that may use a machine learning model. Examples of such institutions include financial institution, FinTechs, etc.

Each pair of nodes 110, 120, 130, 140, and 150 may be represented with an edge between the nodes. The edges represent a relationship between two nodes.

Each institution 110, 120, 130, and 140 may conduct transactions on one or more transaction networks (e.g., a payment network), or may receive transactions that were conducted over one or more transaction networks. The transactions may be conducted with other institutions, with third parties, etc.

The distributed ledger network may be a blockchain-based distributed ledger network. A consensus algorithm may operate on each of the distributed ledger nodes and may update the blockchain-based distributed ledger in which multiple copies of the blockchain-based distributed ledger that exist across the distributed ledger nodes.

In one embodiment, the distributed ledger network may be a private, permissioned distributed ledger network in which only authorized institutions have permission to access the distributed ledger network, and the transactions that are posted are private to only the parties to the transactions. For example, an institution may post its local machine learning model to the distributed ledger network as a private transaction that only the positing financial institution and the trusted entity may access. An example of such a permissioned distributed ledger network is the Quorum distributed ledger network.

Each institution 110, 120, 130, and 140 may execute a computer program (not shown) that may take certain actions with its local machine learning model, and may communicate with the participants of the distributed ledger network.

Each institution 110, 120, 130, 140 may be provided intelligent services 115, 125, 135, and 145, respectively. Intelligent services 115, 125, 135, and 145 may use transaction data from transactions involving the respective institution to create, update, or revise machine learning models or other intelligent services for the respective entity.

In one embodiment, intelligent services 115, 125, 135, and 145 may train local machine learning models to detect anomalies in transactions. Examples of anomalies may include anomalous parties, amounts, goods or services, timings, regions, etc.

Trusted entity 150 may be any suitable entity that may aggregate the local machine learning models into an aggregated machine learning model. In one embodiment, trusted entity 150 may also be an institution, such as a financial institution, a FinTech, etc., and may participate as such an institution in the distributed ledger network. Trusted entity 150 may participate as a distributed ledger node, or it may interact with the distributed ledger network using, for example, an API.

Trusted entity 150 may also execute a computer program (not shown) that may take certain actions with an aggregated machine learning model, and may communicate with the participants of the distributed ledger network.

Trusted entity 150 may be provided with intelligent services 155 that may aggregate the local machine learning models into the aggregated machine learning model using, for example, a secure aggregation protocol. The aggregated machine learning model may be used to identify anomalies in metadata for transactions involving any of nodes 110, 120, 130 and/or 140.

Intelligent services 155 may further include a real-time anomaly detection engine that may detect anomalies in graph data. In one embodiment, the real-time anomaly detection engine may implement the Microcluster-Based Detector of Anomalies in Edge Streams-F ("MIDAS-F") algorithm and may return scores for individual nodes as well as pairs of nodes. An example of the MIDAS-F algorithm is disclosed in Bhatia et al., "Real-Time Anomaly Detection in Edge Streams" available at arxiv.org/abs/2009.08452, the disclosure of which is hereby incorporated, by reference, in its entirety.

Figure 2:
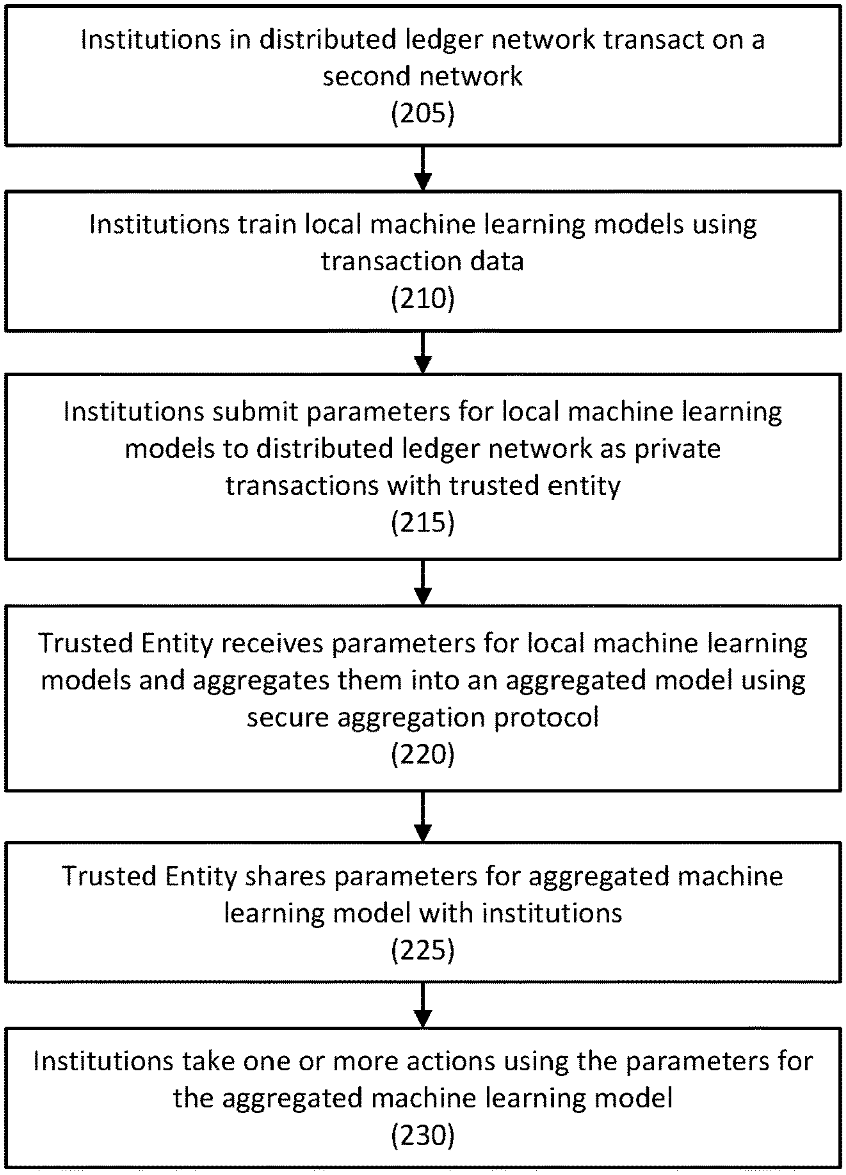
FIG. 2 depicts a method for federated training in privacy preserving, network analytics, and anomaly detection on decentralized, private, permissioned distributed ledger networks according to an embodiment.

Referring to FIG. 2, a method for federated training in privacy preserving, network analytics, and anomaly detection on decentralized, private, permissioned distributed ledger networks is disclosed according to an embodiment.

In step 205, institutions, such as financial institutions, may conduct transactions on one or more transaction network, such as a payment network. Alternately, the institutions may receive transaction data from an associated entity.

In step 210, the institutions may use the transaction data to train local machine learning models to detect anomalies. For example, the institutions may execute one or more computer programs that may train the local machine learning models with the transaction data. In one embodiment, the local models may train the DeepAnT model for anomaly detection. The DeepAnT model is disclosed in Munir et al., "DeepAnT: A Deep Learning Approach for Unsupervised Anomaly Detection in Time Series," *IEEE Access, vol.* 7, pp. 1991-2005, 2019, the disclosure of which is hereby incorporated, by reference, in its entirety.

In step 215, the computer programs for the institutions may submit parameters for their respective local machine learning models as private transactions in a distributed ledger network, such as a private and/or permissioned distributed ledger network. In one embodiment, the private transactions may be identified as private between the respective institution and the trusted entity so that only the respective institution and the trusted entity can access the local machine learning model.

In one embodiment, the nodes may use private-public key pairs to write private transactions to the distributed ledger. For example, the trusted node may publish its public key to the distributed ledger network, and each node may encrypt its data with its public key, and may encrypt that data and the node's public key with the trusted node's public key. It may then write the transaction to the distributed ledger. The only node that may decrypt the transaction is the trusted node using its private key.

The nodes may generate new key pairs for each communication with the trusted node to preserve anonymity.

An example of using the public and private keys in this matter is disclosed in U.S. patent application Ser. No. 17/649,471, filed Jan. 31, 2022, the disclosure of which is hereby incorporated, by reference, in its entirety.

In step 220, a computer program executed by the trusted entity may receive the parameters for the local machine learning models from the institutions and may aggregate the parameters into an aggregated machine learning model using, for example, a secure aggregation protocol. Examples of the secure aggregation protocol are described in Indian Patent Application No. 202011050561, filed Nov. 20, 2022, U.S. patent application Ser. No. 17/456,113 filed Nov. 20, 2021, and Behera et al. "Federated Learning using Distributed Messaging with Entitlements for Anonymous Computation and Secure Delivery of Model" (2020) available at dx.doi.org/10.36227/techrxiv.13318163.v1. The disclosures of each of these documents is hereby incorporated, by reference, in its entirety.

The aggregated machine learning model may also be a DeepAnT model.

In step 225, the computer program executed by the trusted entity may communicate parameters for the aggregated machine learning model to the institutions by posting the aggregated model on the distributed ledger network. The posting may be a public transaction that may be accessed by any of the institutions in the distributed ledger network that are permissioned to access the posting. In another embodiment, the posting may be posted as a private transaction for one of the institutions.

In one embodiment, the trusted node may encrypt a transaction with each participant node's public key and write the transactions to the distributed ledger. In one embodiment, the transaction may include updates to the aggregated machine learning model. Each node may receive a different update depending on the node's submitted parameters.

In step 230, after receiving the aggregated machine learning model, each institution may take one or more action with the aggregated machine learning model. For example, the institutions may update their respective local machine learning model with the aggregated machine learning model, may perform anomaly detection, may perform network analytics, etc.

The process may continue until a condition is reached, such as the local machine learning models have converged, etc.

Figure 3:
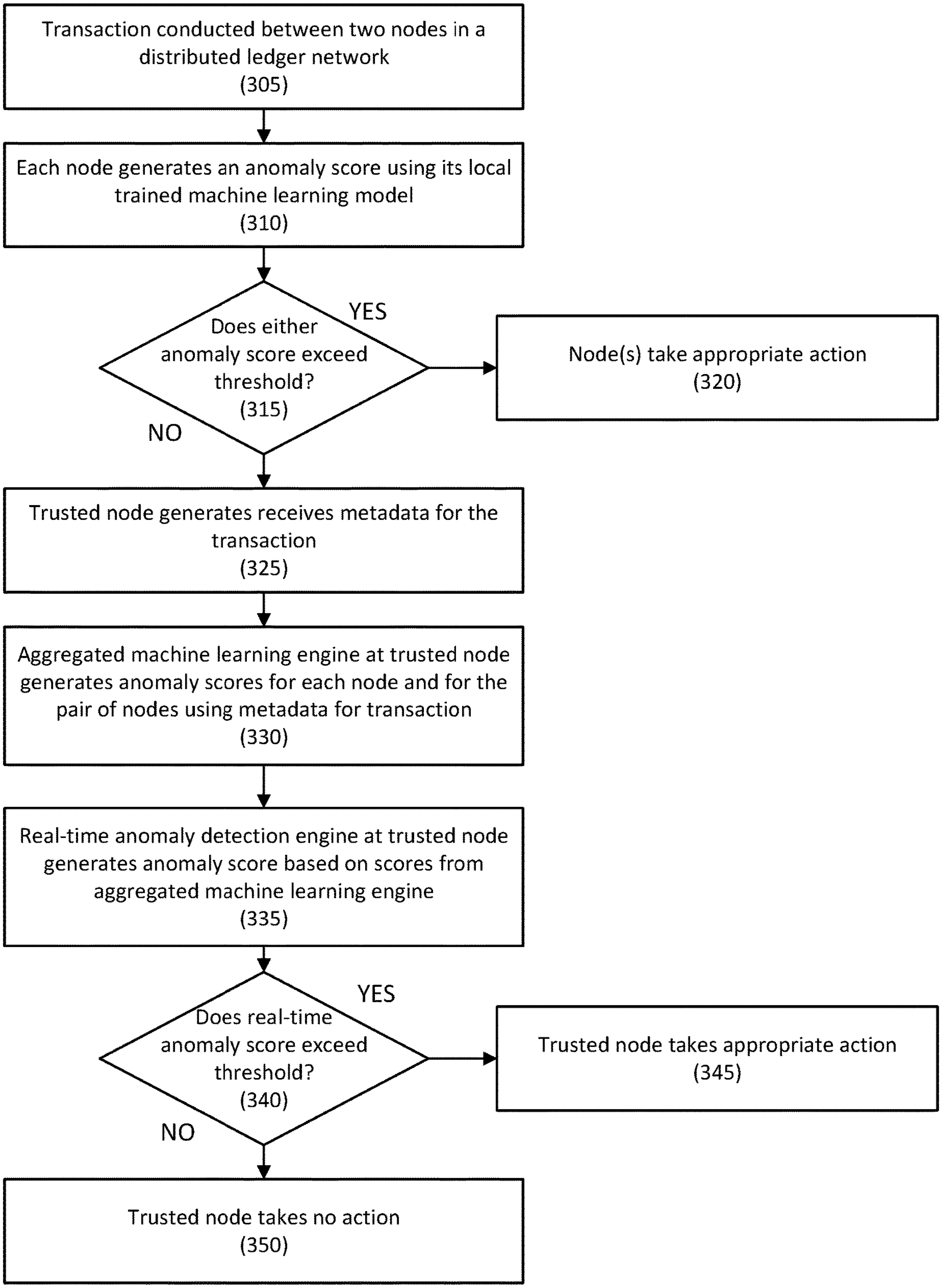
FIG. 3 depicts a method for privacy preserving, network analytics, and anomaly detection on decentralized, private, permissioned distributed ledger networks according to an embodiment.

Referring to FIG. 3, a method for privacy preserving, network analytics, and anomaly detection on decentralized, private, permissioned distributed ledger networks is disclosed according an embodiment.

In step 305, a transaction involving two nodes in a distributed ledger network may be conducted. In one embodiment, the transaction may be a financial transaction involving an account at each institution. In one embodiment, the transaction may be a private transaction or a public transaction.

In step 310, using each node's trained machine learning model (e.g., Deep-AnT models) and based on the transaction data (e.g., parties, accounts, amounts, etc.), the nodes may generate an anomaly score for the transaction. If, in step 315, the score is above a threshold, in step 320, one or both nodes may take an action, such as declining the transaction, sending an alert, etc.

In step 325, the trusted node may receive metadata for the transaction, such as the parties involved, type of transaction, etc. from the distributed ledger, from one or both of the nodes involved in the transaction, etc.

In step 330, the trusted node may input the metadata to the aggregated machine learning model (e.g., a DeepAnT model that aggregates parameters from the nodes in the distributed ledger network), and may receive an anomaly score for each node involved in the transaction as well as an anomaly score for the pair of nodes.

In step 335, the trusted node may also provide the scores to a real-time anomaly detection engine that may detect anomalies in the transaction data, such as the MIDAS-F algorithm.

In step 340, if the real-time anomaly score exceeds a threshold, in step 345, the trusted node may take an action, such as generating an alert, performing network maintenance, etc. In one embodiment, the alert may be sent to the nodes involved in the transaction, and the node may take any action it deems appropriate, such as stopping the transaction.

If the real-time anomaly score exceeds a threshold, in step 350, the trusted node may not take an action.

Although embodiments have been described in the context of anomaly detection, it should be recognized that embodiments may have other applications, including for example collaborative intelligence solutions (e.g., in finance, in health care, etc.), detecting anomalies in social networks, in financial forensics, etc.

In addition, although several embodiments have been disclosed, the embodiments are not exclusive, and features disclosed in one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for privacy preserving machine learning model sharing, comprising:

receiving, by a computer program for a first institution of a plurality of institutions in a distributed ledger network, transaction data for a transaction;

training, by the computer program for the first institution, a local machine learning model using the transaction data;

writing, by the computer program for the first institution, parameters for the local machine learning model to a distributed ledger in the distributed ledger network as an encrypted private transaction with a trusted entity, wherein the trusted entity is configured to receive the parameters for the local machine learning model and parameters for a plurality of other local machine learning models for other institutions of the plurality of institutions from the distributed ledger that are submitted as encrypted private transactions with the trusted entity, to aggregate the parameters for the local machine learning model and the parameters for the plurality of other local machine leaning models into an aggregated machine learning model, and to submit aggregated parameters for the aggregated machine learning model to the distributed ledger network as one or more transactions, wherein each of the encrypted private transactions is private to the institution submitting the private transaction and the trusted entity such that only the institution submitting the encrypted private transaction and the trusted entity can access the parameters in the encrypted private transaction;

receiving, by the computer program for the first institution and from the distributed ledger network, the aggregated parameters for the aggregated machine learning model; and updating, by the computer program for the first institution, the local machine learning model with the aggregated parameters for the aggregated machine learning model.

2. The method of claim 1, wherein the local machine learning model is trained to detect transaction anomalies.

3. The method of claim 1, wherein the local machine learning model and/or the aggregated machine learning model comprises a DeepAnT model.

4. The method of claim 1, wherein the trusted entity aggregates the parameters into the aggregated machine learning model using a secure aggregation protocol.

5. The method of claim 1, wherein the aggregated parameters for the aggregated machine learning model are received in a private transaction.

6. The method of claim 1, wherein the aggregated parameters for the aggregated machine learning model comprise updates to the local machine learning model.

7. The method of claim 1, further comprising:

receiving, by the computer program for the first institution, transaction data for a transaction between the first institution and a second institution;

generating, by the computer program for the first institution and using the local machine learning model, an anomaly score for the transaction based on the transaction data; and providing, by the computer program for the first institution, metadata for the transaction to the trusted entity, wherein the trusted entity generates anomaly scores for the first institution, the second institution, and a pair of the first institution and the second institution using the metadata.

8. The method of claim 7, further comprising:

executing, by the computer program for the first institution, an action in response to the anomaly score exceeding a threshold, wherein the response comprises stopping the transaction.

9. The method of claim 7, further comprising:

receiving, by the computer program for the first institution and from the trusted entity an alert, wherein the trusted entity generates the alert in response to a real-time anomaly score generated by a real-time anomaly detection engine exceeding a threshold.

10. The method of claim 9, further comprising:

executing, by the computer program for the first institution, an action in response to the real-time anomaly score exceeding a threshold, wherein the response comprises stopping the transaction.

11. A method for privacy preserving machine learning model sharing, comprising:

receiving, by a computer program for a trusted entity in a distributed ledger network, a plurality of encrypted private transactions from a plurality of institutions written to a distributed ledger in the distributed ledger network, each of the encrypted private transactions comprising parameters for a local machine learning model for one of the institutions, and each of the encrypted private transactions is private to the institution submitting the encrypted private transaction and the trusted entity such that only the institution submitting the encrypted private transaction and the trusted entity can access the parameters in the encrypted private transaction;

aggregating, by the computer program for the trusted entity, the parameters from the encrypted private transactions into an aggregated machine learning model; and submitting, by the computer program for the trusted entity, aggregated parameters for the aggregated machine learning model to the distributed ledger network;

wherein each of the plurality of institutions is configured to receive the aggregated parameters from the distributed ledger network and to update its local machine learning model with the aggregated parameters.

12. The method of claim 11, wherein the local machine learning models are trained to detect transaction anomalies.

13. The method of claim 11, wherein the local machine learning models and/or the aggregated machine learning model comprises a DeepAnT model.

14. The method of claim 11, wherein the trusted entity aggregates the parameters into the aggregated machine learning model using a secure aggregation protocol.

15. The method of claim 11, wherein the aggregated parameters for the aggregated machine learning model are submitted to the distributed ledger network as a plurality of private transactions.

16. The method of claim 11, wherein the aggregated parameters for a first institution of the plurality of institutions are different from the aggregated parameters for a second institution of the plurality of institutions.

17. The method of claim 11, wherein the aggregated parameters for the aggregated machine learning model comprise updates to the local machine learning models.

18. The method of claim 11, further comprising:

receiving, by the computer program for the trusted entity, anomaly scores from a first institution and a second institution, the first institution and the second institution involved in a transaction;

receiving, by the computer program for the trusted entity, metadata for the transaction between the first institution and the second institution involved in a transaction;

generating, by the computer program for the trusted entity, anomaly scores for the first institution, the second institution, and the pair of the first institution and the second institution using the metadata; and generating, by the computer program for the trusted entity, a real-time anomaly score using a real-time anomaly detection engine and the anomaly scores for the first institution, the second institution, and a pair of the first institution and the second institution.

19. The method of claim 17, further comprising:

generating, by the computer program for the trusted entity, an alert in response to a real-time anomaly score generated by a real-time anomaly detection engine exceeding a threshold.

20. The method of claim 18, wherein the real-time anomaly detection engine executes a Microcluster-Based Detector of Anomalies in Edge Streams-F algorithm.

* * * * *